Figure 1A:
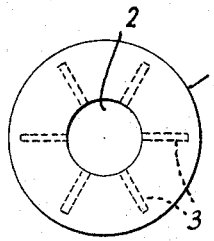

April 28, 1964     A. WATSON     3,131,276
CONTROL OF LOW PRESSURE D.C. ARC DISCHARGES
Filed March 2, 1962     2 Sheets-Sheet 1

Inventor:
Alan Watson
BY Pillars and Bowyer
ATTORNEYS

Inventor:
Alan Watson
BY Pillans and Bowyer
ATTORNEYS 3,131,276
CONTROL OF LOW PRESSURE D.C. ARC DISCHARGES
Alan Watson, Sale, England, assignor to Associated Electrical Industries Limited, London, England, a British company
Filed Mar. 2, 1962, Ser. No. 177,107
Claims priority, application Great Britain Mar. 10, 1961
6 Claims. (Cl. 200—144)

The present invention relates to the control of a D.C. arc discharge occurring between two electrodes contained in an isonisable medium at low pressure.

A sustained D.C. arc is formed when two electrodes, carrying direct current and which are initially in contact with one another in an evacuated enclosure, are separated. Immediately the electrodes start to separate a metal bridge is formed which ruptures on further separation of the electrodes; the root of the bridge remaining on the negative electrode or cathode emits electrons and becomes incandescent. This spot at which electron emission occurs is known as a cathode spot. In general, more than one such cathode spot will exist on the cathode surface. These spots move at random over the cathode surface, the electrons emitted therefrom establishing and maintaining a plasma between the positive electrode or anode and the cathode and thus permitting a discharge current to continue to flow from the anode to the cathode after contact therebetween has been broken.

It is an object of the present invention to provide an electrode assembly of the kind in which two electrodes arranged to come into contact with one another and connectible to the positive and negative terminals of a D.C. source of supply respectively are enclosed in an envelope containing an ionisable medium at a pressure below that of atmosphere, such that the cathode spots formed on the negative electrode, when said electrodes carrying a direct current are separated, are extinguished within a short period after their initiation whereby to cause consequent extinction of the arc discharge stemming therefrom.

According to the present invention, in an electrode assembly of the kind referred to, the negative electrode is provided with a cavity into which the positive electrode is adapted to enter, to establish contact with the negative electrode, said cavity being provided with a plurality of blind holes in the walls thereof, which extend therefrom in a direction radially with respect to the separation of the electrodes, the contacting surfaces of the electrodes being located only at the base of the cavity.

By this means the cathode spots at the roots of the arc formed during separation of the said electrodes are impelled into said blind holes thereby to become extinguished therein.

In order to ensure that the contacting surfaces of the electrodes are located only at the base of the cavity, the end portion of the positive electrode should have a cross-section smaller than that of the cavity.

In carrying out the invention, when both electrodes are, conveniently, of comparable diameters, the positive electrode may be provided with a projection mating substantially with the cavity in the negative electrode, such that the contacting faces thereof are located on the base of the cavity of the negative electrode.

Thus, to restrict the discharge initiated when the electrodes are separated, to only that area at the base of the cavity, the height of the projection is arranged to be greater than the depth of the cavity in the negative electrode.

Conveniently, this cavity is in the form of a cylindrical recess of circular cross-section formed centrally with respect to the said axis of the electrode and is formed with a peripheral wall which is perpendicular to the base of the recess. The blind holes are of small bore when compared with the depth of the cavity and preferably extend radially (and in a common plane perpendicular thereto) to the axis of the electrodes. Alternatively, the blind holes may be replaced by a shallow annular cavity which is effectively equivalent to the use of an infinite number of blind holes. However, the shape of the cavity is not necessarily limited to that of a cylinder.

We have found from results obtained by practical experimentation using an electrode construction in accordance with the present invention, that the provision of a number of blind holes of small bore within the negative electrode, especially when used in conjunction with a suitable magnetic field, encourages the rupture of the D.C. arc, or plasma discharges of the kind described. Consequently, it is envisaged that the invention will find particular application in the construction of a vacuum switch suitable for use in D.C. circuits. Hitherto, vacuum switches constructed have been limited solely for use in A.C. circuits; in this case rupture of the arc discharge is assisted by the fact that the current supply becomes zero at the end of each half-cycle. This condition, of course, does not pertain in a D.C. circuit, and so the known A.C. vacuum switches hitherto designed are not suitable for use in D.C. circuits.

Figure 1:
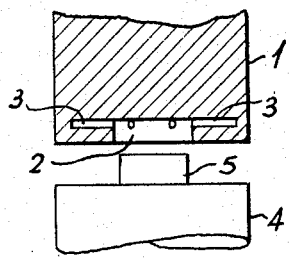
Figure 1B:
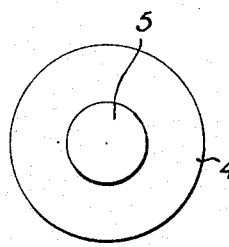
Figure 2:
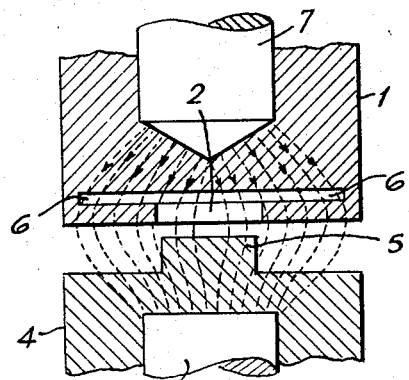
Figure 3:
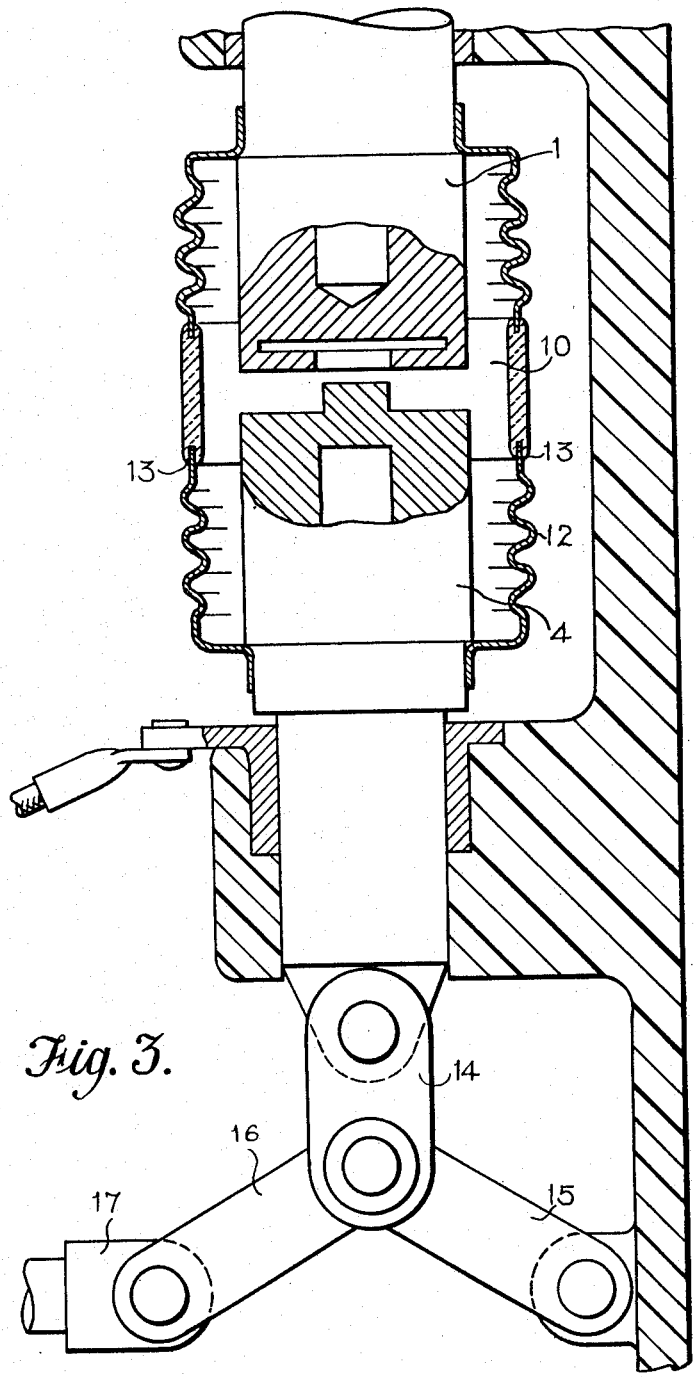

In order that the invention may be more fully understood, it will now be described with reference to the accompanying drawings, in which:

FIG. 1 shows in cross-section a form of electrode structure according to the invention, FIGS. 1a and 1b show in plan view the cathode and anode surfaces, respectively, in the form of electrode structure illustrated in FIG. 1, FIG. 2 shows in cross-section only, a preferable form of electrode construction suitable for use in a vacuum switch working on D.C. supply, and FIG. 3 shows, mainly in cross-section, a vacuum switch comprising the vacuum case, the electrodes contained therein, the vacuum seals, and the associated operating mechanism.

Referring firstly to FIG. 1, the cathode 1 is illustrated as being formed with a cavity 2 central with respect to the axis of separation of the electrode system, and which is conveniently cylindrical in shape. At the base of this cavity and from the wall thereof extend radially a number of blind holes 3 of small bore and of a length somewhat less than the radius of the cathode. The anode 4 is formed with a central projecting portion 5 (also conveniently cylindrical in shape) of slightly smaller width than the width of the cavity 2 in the cathode, in order to permit only the contacting faces of the electrodes to effectively meet and thus also provide a clearance between the walls of the cavity and the projection. When the switch is in the closed position, electrical contact is established between the electrode contact surfaces. When the electrodes are separated, a D.C. arc discharge is set up originating from a metal bridge formed on separating those regions of the electrode surfaces in contact, i.e. only between the base of the cathode cavity and the corresponding contacting face of the projection on the anode, as hereinbefore described.

The electrodes are thus linked by a conducting plasma, each cathode spot moving at random only over that region of the cathode surface located at the base of the cavity. Owing to the magnetic field set up by the arc discharge, the arc roots are progressively impelled into one of the blind holes 3; the cathode spot at the respective arc root then travels along the hole and is extinguished at some point towards the blind end thereof. This progressively destroys the conducting plasma set up between the electrodes, and discharge current consequently ceases to flow through the switch when opened.

A preferred form of the electrode system is illustrated in FIG. 2, in which, where appropriate, the reference numerals shown correspond to those used in connection with FIG. 1. The construction is similar to that shown in FIG. 1, except that a shallow cavity 6 extends from the wall of the cavity 2 formed in the surface of the negative electrode. This cavity will be annular in form if the cavity is cylindrical, and is, in effect, equivalent to the use of an infinite number of blind holes of small bore extending radially from the wall of the cavity. A specially shaped magnetic field (the lines of force of which are as shown), is set up between the permanent magnet or electromagnet pole pieces 7 and 8, which may conveniently be embedded in the cathode and anode, respectively, and hence over the space between the electrodes across which the arc discharge is set up. The purpose of this magnetic field is to encourage the cathode spots to enter the shallow cavity 6. In this embodiment of the invention, the contacting electrodes of the switch should not be of a ferromagnetic material. In order that the magnetic field may be of the desired configuration, the tip of the pole piece embedded in the cathode 7 should be conical in shape; this ensures that the lines of force intercept the cathode surface at an acute angle as shown in FIG. 2, their inclination to the cathode surface being obtained symmetrically with respect to the axis of the system, i.e. to the direct, or shortest, arc path between the electrodes. The shape of the corresponding pole piece 8, embedded in the anode, is not of importance. Any other pole piece shape giving a similar field configuration, or any other field configuration yielding a similar resultant action on the arc discharge, may be used. The pole pieces, giving field strengths of 500 oersted or more as required, may conveniently be energised by coils outside the vacuum chamber.

The radial component tends to move the spots around a circular track. Through the combined effect of the dispersed magnetic field and the effect of reverse driving, the arc roots are progressively encouraged to enter the annular cavity extending from the wall of the cavity and at the base thereof, with consequent rupturing of the arc discharge as above.

A vacuum switch employing switch contacts as described has successfully interrupted currents of the order of 100 amps, and is thus useful for many D.C. switching applications.

One example of a vacuum switch employing switch electrodes as herein described is shown in FIG. 3. In the arrangement shown the switch electrodes 3 and 4 are enclosed within the gas-tight envelope 10 formed by the flexible members 11 and 12 each forming a gas-tight seal with its respective electrodes, said members being arranged to allow movement of said electrodes in a direction along the axis of separation thereof. Electrical insulation between the electrodes is provided by the insulating sealing annulus 13 conveniently of glass, sealed in gas-tight manner to adjacent ends of the flexible members 11 and 12.

In the embodiment of the switch shown one of the inter-engageable electrodes 3 is shown to be moved to provide engagement or disengagement therebetween, conveniently by means of the mechanical arrangement of the levers 14, 15 and 16. In this arrangement movement of the member 17 in a direction remote from the axis of separation of the engaged electrodes will provide through the members 15 and 16 movement of the linking member 14 along said axis to produce disengagement of said electrodes and vice versa.

The electrode 4 may, if required, be similarly moved along the axis of separation of said electrodes by a mechanical arrangement similar to that providing movement of the electrode 4, said arrangement being necessarily insulated therefrom.

What I claim is:

1. A direct current low-pressure switch comprising:
   a positive electrode;
   a negative electrode axially aligned with the positive electrode;
   operating means whereby the electrodes can be moved toward and away from each other in an axial direction;
   a cylindrical spigot provided on the face of the positive electrode and confronting the negative electrode;
   the negative electrode having a cavity facing and axially aligned with said spigot, an annular shoulder on the negative electrode surrounding the cavity, said cavity having a cross section slightly larger than that of the spigot so that the spigot may enter same with an annular clearance therearound, said cavity having a depth less than the length of the spigot so that the spigot will engage the cavity bottom before the face of the positive electrode butts against the annular shoulder on the negative electrode;
   at least one blind recess extending radially outwardly from the cavity;
   a gas tight envelope enclosing the first and second electrodes and permitting axial movement thereof; and
   gas under a low pressure filling the envelope; whereby upon the operating means separating the two electrodes the direct current arc between the spigot and the cavity bottom establishes a plasma originating from cathode spots on the said cavity bottom, and these spots are then mutually repelled to move radially outwardly into the blind recess, where the cathode spot and thus the plasma becomes extinguished.

2. A direct current low-pressure switch according to claim 1, in which a plurality of the blind recesses extend radially outward away from the cavity and are uniformly distributed about the periphery of that cavity.

3. A direct current low-pressure switch according to claim 1, in which the blind recess extending radially outwardly away from the cavity is an annular recess extending about the complete periphery of the central part of the cavity so as to form a lateral extension therearound.

4. A direct current low-pressure switch according to claim 1, in which the annular shoulder of the negative electrode and the spigot of the positive electrode are of non-magnetic material, a first magnetic pole piece is incorporated in the negative electrode adjacent the cavity, and a second magnetic pole piece of opposite polarity is incorporated in the positive electrode adjacent the spigot, the arrangement being such that the magnetic field between the poles extends through the bottom of the cavity, whereby in use the cathode spots tend to travel with a circular component so as to travel in a spiral manner into the recess.

5. A direct current low-pressure switch according to claim 4, in which electromagnetic means disposed outside the envelope are arranged to magnetize the two poles.

6. A direct current low-pressure switch according to claim 4, in which the magnetic poles are poles of permanent magnets.

References Cited in the file of this patent

UNITED STATES PATENTS 3,005,931    Dandl  ---------------- Oct. 24, 1961